United States Patent
Waycuilis et al.

(10) Patent No.: US 6,350,928 B1
(45) Date of Patent: Feb. 26, 2002

(54) PRODUCTION OF A GAS HYDRATE SLURRY USING A FLUIDIZED BED HEAT EXCHANGER

(75) Inventors: John J. Waycuilis, Cypress; Stephen D. York, Missouri City, both of TX (US)

(73) Assignee: Marathon Oil Company, Findlay, OH (US)

(*) Notice: Subject to any disclaimer, the term of this patent is extended or adjusted under 35 U.S.C. 154(b) by 0 days.

(21) Appl. No.: 09/476,297

(22) Filed: Dec. 30, 1999

(51) Int. Cl.$^7$ ............................ C07C 9/00; F17C 7/00
(52) U.S. Cl. ............................................. 585/15
(58) Field of Search ............................................. 585/15

(56) References Cited

U.S. PATENT DOCUMENTS

| | | | | |
|---|---|---|---|---|
| 2,475,255 A | * | 7/1949 | Rollman | 62/57 |
| 3,991,816 A | | 11/1976 | Klaren | 165/1 |
| 4,220,193 A | | 9/1980 | Klaren | 165/1 |
| 4,398,594 A | | 8/1983 | Klaren | 165/104.16 |

FOREIGN PATENT DOCUMENTS

| EP | WO9919282 A1 | 4/1999 |
|---|---|---|
| WO | WO9827033 A1 | 6/1998 |
| WO | WO9910282 A1 | 4/1999 |

OTHER PUBLICATIONS

"Fluidized–Bed Heat Exchanger Avoids Fouling Problems", Chemical Engineering, 2/88, p. 43.
Klaren et al., "The Non–Fouling Fluidized Bed Heat Exchanger", American Society of Mechanical Engineers, Heat Transfer Equipments Fundamentals, Design, Applications and Operating Problems, vol. 108, Book No. H00500, 1/89, p. 273–279.
"Consider Nonfouling Fluidized Bed Exchangers", Hydrocarbon Processing, 7/89, pp. 48–50.
J. S. Gudmundsson et al., "Hydrate Concept for Capturing Associated Gas", SPE 50598, pp. 247–257, presented at 1998 SPE European Petroleum Conference, Oct. 20–22, 1998.
BG Hydrates Workshop, Gas Research Technology Centre, May 24–25, 1999.
J. S. Gudmundsson et al., "NGH on FPSO—Slurry Process and Cost Estimate". SPE 56629, presented at 1999 SPE Annual Technical Conference, Oct. 3–6, 1999.

* cited by examiner

*Primary Examiner*—Walter D. Griffin
(74) *Attorney, Agent, or Firm*—Jack E. Ebel

(57) ABSTRACT

A process is provided for converting a multi-phase fluid stream having an initial gas phase and an initial liquid phase to a gas hydrate slurry. The initial liquid phase includes an initial water and the initial gas phase includes a hydrocarbon gas. An inert solid particle medium is entrained in the multi-phase fluid stream to form a fluidizable mixture which is conveyed through the interior of a heat transfer tube enclosed within a shell. A heat transfer medium resides within the shell, but is external to the heat transfer tube in fluid isolation from the fluidizable mixture. The wall of the heat transfer tube provides a heat transfer surface for heat exchange between the multi-phase fluid stream and the heat transfer medium, cooling the multi-phase fluid stream on contact to a temperature below the gas hydrate formation temperature and converting at least a portion of the hydrocarbon gas and initial water to a plurality of solid gas hydrate particles. The solid particle medium substantially prevents accumulation of the solid gas hydrate particles on the tube wall. The fluidizable mixture is separated from the solid particle medium to recover a gas hydrate slurry containing the plurality of solid gas hydrate particles and the remaining portion of the initial liquid phase.

27 Claims, 3 Drawing Sheets

PRODUCTION OF A GAS HYDRATE SLURRY USING A FLUIDIZED BED HEAT EXCHANGER

TECHNICAL FIELD

The present invention relates generally to the transportation of natural gas and, more particularly, to a process for converting a multi-phase fluid stream containing a hydrocarbon gas and water to a stable gas hydrate slurry using a fluidized bed heat exchanger, wherein the resulting gas hydrate slurry is more suitable for transport.

BACKGROUND OF THE INVENTION

Hydrocarbon gas, and particularly natural gas, produced in remote isolated onshore or offshore regions is often transported great distances to more populous regions for use. Pressurized pipelines or insulated oceangoing tankers are conventional means for transporting large quantities of natural gas. In many cases liquid phase water is mixed with the produced natural gas forming a wet natural gas. At the temperature and pressure conditions frequently encountered in gas pipelines, the natural gas and water react to form solid gas hydrates. The solid gas hydrates can occlude the gas pipeline by building up on the interior walls of the gas pipeline, ultimately aggregating into a plug or blockage.

The present invention recognizes a need for a cost-effective solution to the problem of solid gas hydrate formation in gas pipelines. As such, the present invention teaches a process which is designed to be practiced in advance of transporting a wet natural gas. The present process converts the wet natural gas to a gas hydrate slurry comprising solid gas hydrate particles suspended in a continuous liquid phase. Production of the gas hydrate slurry prior to pipeline transport of the wet natural gas precludes the accumulation of gas hydrates in the pipeline.

Several methods are known in the prior art for producing solid gas hydrates, but none are deemed satisfactory for the process of the present invention. For example, U.S. Pat. No. 5,536,893 to Gudmundsson teaches a method for producing gas hydrates in the form of a fluffy powder by spraying chilled liquid water into a cooled gas. PCT Patent Application WO9827033A1 to Heinemann et al. teaches a method for producing gas hydrates by adiabatically expanding a mixture of water and a cooled compressed gas across a nozzle to a lower pressure. Expansion of the mixture atomizes the water and produces solid gas hydrates. PCT Patent Application WO9919282A1 to Heinemann et al. teaches a method for producing gas hydrates in a fluidized bed reactor by conveying a gas phase upward to fluidize a bed of solid particles, while contacting the gas phase with a downwardly flowing chilled liquid water phase. All of the above-recited methods for producing gas hydrates are relatively inefficient because gas hydrate formation is an exothermic reaction and the evolution of latent heat in the reaction undesirably limits conversion. The above-recited methods require substantial preliminary sub-cooling of the feed streams or large adiabatic pressure drops, both of which substantially increase the cost and complexity of practicing the method.

Accordingly, it is an object of the present invention to provide an effective process for transporting a wet hydrocarbon gas, while substantially avoiding pipeline occlusion due to gas hydrate accumulation. More particularly, it is an object of the present invention to provide a process for efficiently converting a wet hydrocarbon gas to a gas hydrate slurry, wherein the gas hydrate slurry is suitable for transport. It is another object of the present invention to provide a process for converting a wet hydrocarbon gas to a gas hydrate slurry, wherein the conversion reaction is more nearly isothermal than in known conversion processes. It is another object of the present invention to provide a process for converting a wet hydrocarbon gas to a gas hydrate slurry, wherein the pressure losses associated with the conversion reaction are minimized. These objects and others are achieved in accordance with the invention described hereafter.

SUMMARY OF THE INVENTION

The present invention is a process for converting a multi-phase fluid stream to a gas hydrate slurry which is particularly suitable for transport via a motorized tanker transport vehicle or a pipeline. The multi-phase fluid stream contains an initial liquid phase comprising an initial water and an initial gas phase comprising a hydrocarbon gas. The process is initiated by entraining an abrasive inert solid particle medium in the multi-phase fluid stream to form a fluidizable mixture. The fluidizable mixture is conveyed through the interior of a heat transfer tube which is enclosed within a shell. A heat transfer medium resides within the shell, but is external to the heat transfer tube in fluid isolation from the fluidizable mixture. The wall of the heat transfer tube provides a heat transfer surface for heat exchange between the multi-phase fluid stream and the heat transfer medium which is cooler than the multi-phase fluid stream. When the multi-phase fluid stream contacts the tube wall, the multi-phase fluid stream is cooled to a temperature below the gas hydrate formation temperature. Consequently, at least a portion of the hydrocarbon gas and at least a portion of the initial water in the multi-phase fluid stream are converted to a plurality of solid gas hydrate particles. The solid particle medium substantially prevents accumulation of the solid gas hydrate particles on the tube wall, maintaining the plurality of solid gas hydrate particles in an unconsolidated condition within the fluidizable mixture. The fluidizable mixture, including the plurality of solid gas hydrate particles, is separated from the solid particle medium to recover a gas hydrate slurry. The gas hydrate slurry comprises a slurry solid phase suspended in a slurry liquid phase, wherein the slurry solid phase is the plurality of solid gas hydrate particles and the slurry liquid phase is the remaining portion of the initial liquid phase.

The remaining portion of the initial liquid phase contains one or more liquid phase components including a hydrocarbon liquid, an additive water, or an excess initial water. Where the initial water is the limiting reactant, the additive water may be added to multi-phase fluid stream before the conversion step as part of the initial liquid phase to convert substantially all of the hydrocarbon gas to solid gas hydrate particles. The additive water may also be added to the multi-phase fluid stream before, during or after the conversion step as part of the initial liquid phase for ultimate inclusion in the slurry liquid phase.

In accordance with a specific embodiment of the present invention, the process utilizes a fluidized bed heat exchanger having a shell enclosing a heat transfer medium flowpath, a fluidizable mixture flowpath in fluid isolation from the heat transfer medium flowpath, a heat transfer surface in heat communication with the heat transfer medium flowpath and fluidizable mixture flowpath, and an internal downcomer. The portion of the shell enclosing the heat transfer surface defines a heat transfer zone. The heat transfer medium is conveyed through the heat transfer medium flowpath to cool the heat transfer surface. The fluidizable mixture is simultaneously conveyed through the fluidizable mixture flowpath and is cooled upon contact with the heat transfer surface to form the plurality of solid gas hydrate particles. The fluidizable mixture, including the solid gas hydrate particles, is withdrawn from the heat transfer zone and the solid gas hydrate particles are separated from the solid particle medium to recover the gas hydrate slurry. The solid particle medium is returned to the heat transfer zone via the internal downcomer.

In accordance with an alternate specific embodiment of the present invention, the process utilizes a fluidized bed heat exchanger which is substantially the same as the above-described fluidized bed heat exchanger except that the present fluidized bed heat exchanger has an external separator and downcomer rather than an internal downcomer. Accordingly, the present fluidized bed heat exchanger operates in substantially the same manner as the above-recited embodiment except that the fluidizable mixture, including the solid gas hydrate particles, is conveyed to the external separator after withdrawal from the heat transfer zone. The solid gas hydrate particles are separated from the solid particle medium in the external separator to recover the gas hydrate slurry and the solid particle medium is returned to the heat transfer zone via the external downcomer.

In accordance with another alternate specific embodiment of the present invention, the process utilizes a fluidized bed heat exchanger which is substantially the same as the above-described fluidized bed heat exchangers except that the present fluidized bed heat exchanger lacks a downcomer and has heat transfer tubes extending upward into the separation zone of the fluidized bed heat exchanger. Accordingly, the present fluidized bed heat exchanger operates in substantially the same manner as the above-recited embodiments except that separation of the solid particle medium from the solid gas hydrate particles and remaining fluid components is performed in the upper portion of the heat transfer tubes. Thus, the solid particle medium does not recirculate, but remains at all times in the heat transfer tubes.

The invention will be further understood from the accompanying drawings and description.

DESCRIPTION OF PREFERRED EMBODIMENTS

Figure 1:
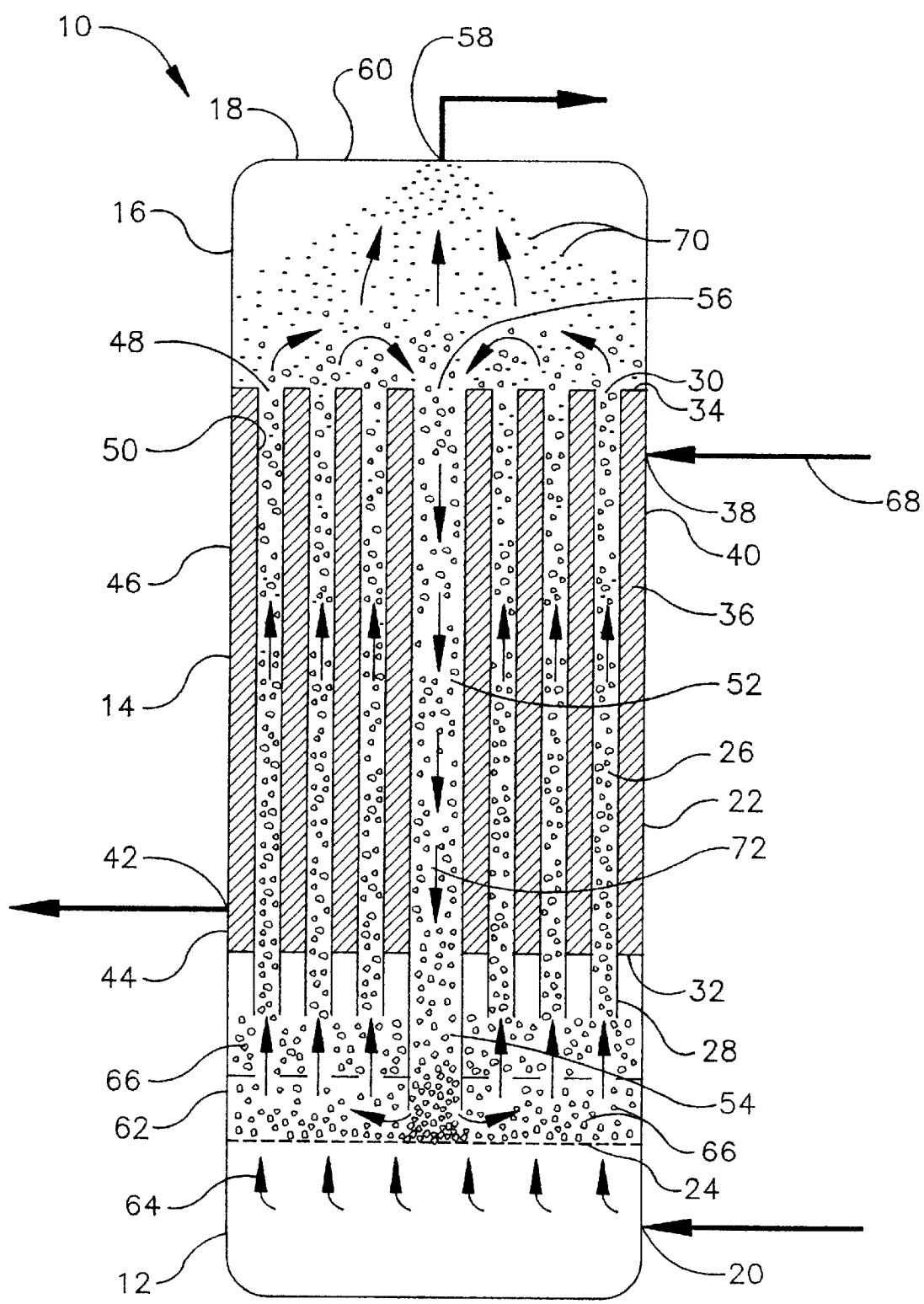
FIG. 1 is a conceptualized cross-sectional view of a fluidized bed heat exchanger having utility in a first embodiment of the process of the present invention.

Referring to FIG. 1, a vertically-oriented tubular fluidized bed heat exchanger (FBHX) is shown and designated 10. The FBHX 10 is substantially similar to those disclosed in U.S. Pat. Nos. 3,991,816; 4,220,193; and 4,398,594; incorporated herein by reference. However, the FBHX 10 is specifically adapted for use in the gas hydrate slurry production process of the present invention. The FBHX 10 is characterized by an internally circulating fluidized bed. The FBHX 10 is functionally partitioned into a plurality of vertically stratified chambers including a lower chamber 12, a middle chamber 14, and an upper chamber 16. The lower chamber 12 is functionally defined as a mixing zone, the middle chamber 14 is functionally defined as a heat transfer zone, and the upper chamber 16 is functionally defined as a separation zone. A shell 18 surrounds the FBHX 10, defining a continuous vessel which encloses the lower, middle, and upper chambers 12, 14, 16.

The chambers 12, 14, 16 are provided with specific elements which enable the above-recited functions. In particular, the lower chamber 12 is provided with a multi-phase fluid stream inlet 20 which opens into the lower chamber 12 through a vertical side 22 of the shell 18. A perforated distribution plate 24 is horizontally disposed across the lower chamber 12 above the multi-phase fluid stream inlet 20, effectively horizontally bisecting the lower chamber 12. The middle chamber 14 is provided with a plurality of substantially parallel open-ended riser tubes 26 which are vertically disposed within the middle chamber 14. The lower ends 28 of the tubes 26 are open to the lower chamber 12, while the upper ends 30 of the tubes 26 are open to the upper chamber 16. A lower tube plate 32 is positioned proximal to the lower ends 28 at the interface between the lower and middle chambers 12, 14. An upper tube plate 34 is correspondingly positioned proximal to the upper ends 30 at the interface between the middle and upper chambers 14, 16. The tubes 26 are spatially separated from one another, providing an interstitial space 36 between the tubes 26. The lower tube plate 32 and upper tube plate 34 prevent fluid communication between the interstitial space 36 and the lower and upper chambers 12, 16, respectively.

The middle chamber 14 is provided with a heat transfer medium inlet 38 which opens into an upper portion 40 of the middle chamber 14 through the vertical side 22 of the shell 18. The middle chamber 14 is further provided with a heat transfer medium outlet 42 which exits from a lower portion 44 of the middle chamber 14 through the opposite vertical side 46 of the shell 18. The heat transfer medium inlet 38, interstitial space 36, and heat transfer medium outlet 42 define a heat transfer medium flowpath. The heat transfer medium flowpath is in fluid isolation from the lower and upper chambers 12, 16 and the tube interiors 48 which define a fluidizable mixture flowpath. However, the external side of the tube walls 50 is in fluid contact with the heat transfer medium flowpath at the interface between the tubes 26 and the interstitial space 36. An internal downcomer 52 is vertically and centrally disposed within the middle chamber 14. The internal downcomer 52 is in substantially parallel alignment with the tubes 26 and has a substantially greater inside diameter than the tubes 26. The internal downcomer 52 has a lower end 54 which is open to the lower chamber 12 and an upper end 56 which is open to the upper chamber 16. The upper chamber 16 is an essentially open head space or freeboard. The upper chamber 16 is provided with a gas hydrate slurry outlet 58 which exits from the upper chamber 16 through the top 60 of the shell 18. The gas hydrate slurry outlet 58 may be connected to a storage tank or transport means such as a pipeline or a motorized tanker transport vehicle (not shown).

The present gas hydrate slurry production process is practiced by feeding a multi-phase fluid stream to the lower chamber 12 of the FBHX 10 via the multi-phase fluid stream inlet 20. The multi-phase fluid stream contains an initial liquid phase and an initial gas phase. The initial liquid phase comprises an initial water and the initial gas phase comprises a pressurized hydrocarbon gas. In general, the initial water is any aqueous composition such as fresh water or brine, which coexists in a mixture with the hydrocarbon gas and is naturally-occurring, i.e., has not been intentionally added to the hydrocarbon gas. For example, the multi-phase fluid stream may be a hydrocarbon production stream produced from a subsurface formation, wherein the hydrocarbon gas is natural gas and the initial water is composed of brine from the formation and/or water condensed from the hydrocarbon gas upon cooling. The initial water concentration in the multi-phase fluid stream is typically in a range of about 1 to 5% by weight. The initial liquid phase may optionally contain one or more other liquid phase components, such as a hydrocarbon liquid or an additive liquid phase component. The additive liquid phase component may be any liquid phase component, such as an additive water, which the practitioner may intentionally add to the multi-phase fluid stream to facilitate formation of the gas hydrate slurry or to enhance the properties of the resulting gas hydrate slurry, as described hereafter. The hydrocarbon liquid may be any hydrocarbon liquid which coexists in a mixture with the hydrocarbon gas and initial water such as a crude oil produced in a hydrocarbon production stream from a subsurface formation.

The multi-phase fluid stream enters the lower chamber 12 at a rate of about 10,000 to 15,000 kg/hr, a temperature in a range of about 10 to 30° C., and a pressure in a range of about 5,000 to 35,000 kPa. The multi-phase fluid stream is conveyed upward through the distributor plate 24 which uniformly distributes the multi-phase fluid stream radially across an upper portion 62 of the lower chamber 12 as shown by the arrows 64. Immediately after passing through the distributor plate 24, the multi-phase fluid contacts a solid particle medium 66 which resides in the upper portion 62 of the lower section 12. The solid particle medium 66 is a plurality of divided particles formed from a substantially inert, hard, abrasive material, such as chopped metal wire, gravel, or beads formed from glass, ceramic or metal. The multi-phase fluid stream is conveyed upward through the upper portion 62 at a superficial velocity which substantially entrains the solid particle medium 66 to form a fluidizable mixture comprising the multi-phase fluid stream and the solid particle medium 66. More particularly, the multi-phase fluid stream is conveyed through the upper portion 62 at a superficial velocity which is sufficient to fluidize the solid particle medium 66, wherein the multi-phase fluid stream constitutes the fluidizing medium and the entrained solid particle medium 66 constitutes the fluidized bed.

The fluidizable mixture passes from the lower chamber 12 upward into the open lower ends 28 of the tubes 26 and through the tube interiors 48 within the middle chamber 14. A heat transfer medium is simultaneously conveyed into the middle chamber 14 via the heat transfer medium inlet 38. The heat transfer medium can be substantially any conventional coolant and is preferably a liquid heat transfer medium selected from among water, glycol-water mixtures, mineral oil, or other conventional commercially available heat transfer liquids or refrigerants. The heat transfer medium enters the middle chamber 14 at a rate of about 20,000 to 30,000 kg/hr, a temperature in a range of about 0 to 20° C., and a pressure in a range of about 100 to 10,000 kPa. The heat transfer medium passes downward through the interstitial space 36 until reaching the heat transfer medium outlet 42 where the heat transfer medium is discharged as shown by arrows 68.

The heat transfer medium is in continuous contact with the external side of the tube walls 50 during its descent through the chamber section 14, while the fluidizable mixture is in continuous contact with the internal side of the tube walls 50 during its ascent through the middle chamber 14. The tube walls 50 are formed from a heat conductive material, which provides an effective heat transfer surface for the multi-phase fluid stream. The heat transfer medium cools the multi-phase fluid stream in the middle chamber 14 from the above-recited temperature range to a cooled temperature range of about 5 to 25° C. which is below the minimum gas hydrate formation temperature of the multi-phase fluid stream. Thus, the heat transfer medium sufficiently cools the multi-phase fluid stream in the middle chamber 14 to cause gas hydrate formation. In particular, at least a portion of the initial water in the initial liquid phase and at least a portion of the hydrocarbon gas in the initial gas phase react to form a plurality of unconsolidated solid gas hydrate particles 70 in the tube interiors 48. Preferably either all of the initial water or all of the hydrocarbon gas in the multi-phase fluid stream is consumed by the conversion reaction. The resulting solid gas hydrate particles 70 typically have a crystalline structure within a very small controlled size range of about 0.1 to 1.0 mm which renders the solid gas hydrate particles 70 relatively benign, i.e., resistant to agglomeration. The solid gas hydrate particles 70 are likewise entrained in the fluidizing medium as the fluidizable mixture passes upward through the tube interiors 48.

The solid particle medium 66 experiences turbulent flow while it is fluidized within the tube interiors 48, causing the solid particle medium 66 to collide with the internal sides of the tube walls 50 and with the solid gas hydrate particles 70 entrained in the fluidizable mixture. The collisions produce a scouring action, diminishing the ability of the solid gas hydrate particles 70 to accumulate on the internal sides of the tube walls 50 and displacing any solid gas hydrate particles 70 which adhere thereto. Thus, the solid particle medium 66 substantially prevents or reduces fouling or plugging of the tube interiors 48 caused by solid gas hydrate particle build-up. The collisions also control the ultimate size of the solid gas hydrate particles 70.

The fluidizable mixture continues out the open upper ends 30 of the tubes 26 into the upper chamber 16. When the fluidizable mixture reaches the upper chamber 16, it disperses causing the more dense solid particle medium 66 to separate by gravity from the less dense solid gas hydrate particles 70 and the remaining fluid components of the multi-phase mixture. The remaining fluid components comprise the remaining portion of the initial liquid phase and the remaining portion of the initial gas phase, if any. The remaining portion of the initial liquid phase may be one or more of the following components: excess initial water, an additive liquid phase component or a hydrocarbon liquid. The remaining portion of the initial gas phase, if any, is excess hydrocarbon gas.

The internal downcomer 52 enables auto-recirculation of the separated solid particle medium 66. In particular, the solid particle medium 66 returns to the lower chamber 12 by falling under the force of gravity from the upper chamber 16 into the axially aligned open upper end 56 of the internal downcomer 52, passing downwardly through the internal downcomer 52, and exiting the internal downcomer 52 via the open lower end 54 into the lower chamber 12 as shown by the arrows 72. The solid gas hydrate particles 70 remain suspended in the remaining portion of the initial liquid phase to provide a stable gas hydrate slurry recoverable from the upper chamber 16 via the gas hydrate slurry outlet 58.

The gas hydrate slurry comprises a slurry solid phase suspended in a slurry liquid phase. The slurry solid phase is the solid gas hydrate particles 70, which make up about 1 to 75% by weight of the gas hydrate slurry. The remainder of the gas hydrate slurry is made up of the slurry liquid phase, which is the remaining portion of the initial liquid phase. The gas hydrate slurry is withdrawn from the upper chamber 16 via the gas hydrate slurry outlet 58 at a rate of about 9,000 to 15,000 kg/hr, a temperature in a range of about 1 to 25° C., and a pressure in a range of about 4,500 to 34,900 kPa. A remaining portion of the initial gas phase may be mixed with the gas hydrate slurry when it exits the gas hydrate slurry outlet 58. Where the initial gas phase is the limiting reactant, the remaining portion of the initial gas phase, if any, is usually relatively small, making up only about 0 to 10% by volume of the material exiting the gas hydrate slurry outlet 58. In any case, the gas hydrate slurry exiting the gas hydrate slurry outlet 58 is typically conveyed to a storage tank (not shown) for later transport or immediately transported via a pipeline or a motorized tanker transport vehicle such as a truck or a ship (not shown).

As noted above, the practitioner may optionally add additive liquid phase components to the multi-phase fluid, particularly in cases where either the initial water or the hydrocarbon gas is the limiting reactant in the gas hydrate formation reaction. Where the initial water is the limiting reactant, substantially all of the initial water is converted to solid gas hydrate particles 70, while excess hydrocarbon gas remains. The excess hydrocarbon gas, which constitutes the remaining portion of the initial gas phase, can exit the FBHX 10 mixed with the gas hydrate slurry. Alternatively, an additive water can be added to the multi-phase fluid to convert all of the excess hydrocarbon gas to solid gas hydrate particles 70 so that substantially no free hydrocarbon gas remains in the product of the FBHX 10 which exits the upper chamber 16.

Since the gas hydrate slurry requires at least one liquid phase component, the requirement may be satisfied by the presence of a naturally-occurring hydrocarbon liquid in the multi-phase fluid stream. If no hydrocarbon liquid is present in the multi-phase fluid stream, the requirement may be satisfied by adding an additive liquid phase component to the multi-phase fluid stream. The additive liquid phase component is preferably an additive water and more preferably an additive brine due to its low cost availability, although other additive liquid phase components such as an additive fresh water or an additive hydrocarbon liquid may likewise be employed. Additive brines are generally available at low cost, such as filtered sea water or brines produced from subterranean formations in association with hydrocarbon production operations. In any case, the additive liquid phase component is added to the multi-phase fluid stream either before it is fed to the FBHX 10, while it is in the FBHX 10, or after it exits the FBHX 10. Where the hydrocarbon gas is the limiting reactant, all of the hydrocarbon gas is converted to solid gas hydrate particles 70, while excess initial water remains. The excess initial water exits the FBHX 10 as at least a part of the remaining portion of the initial liquid phase of the gas hydrate slurry.

Figure 2:
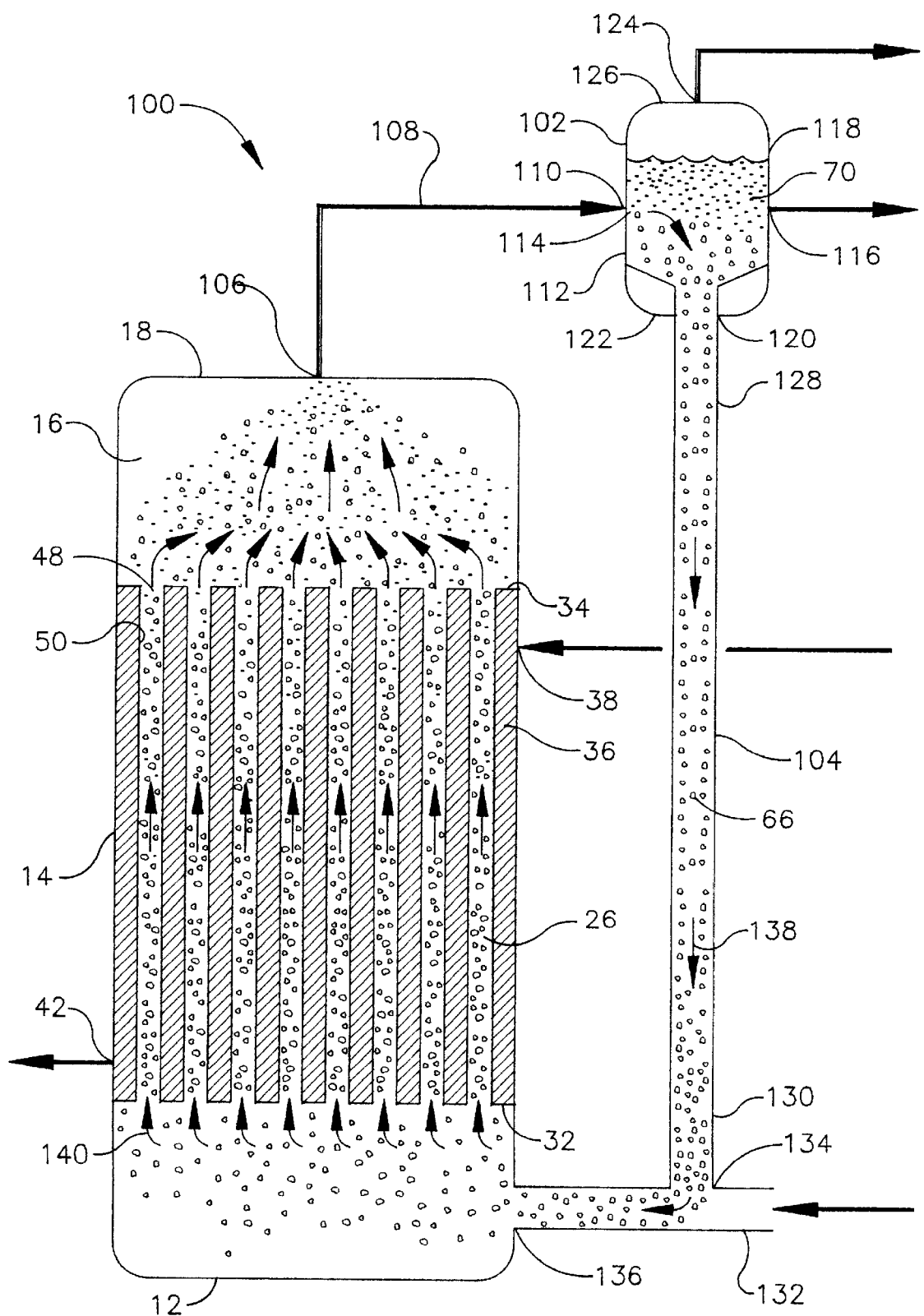
FIG. 2 is a conceptualized cross-sectional view of a fluidized bed heat exchanger having utility in a second embodiment of the process of the present invention.

Referring to FIG. 2, an alternate fluidized bed heat exchanger (FBHX) is shown and designated 100. The FBHX 100 is substantially similar to the FBHX 10 shown in FIG. 1, but the FBHX 100 is specifically adapted for use in an alternate embodiment of the gas hydrate slurry production process of the present invention. Accordingly, elements which are common to both FBHX's 10 and 100 are referred to by the same reference characters. The FBHX 100 is characterized by an externally circulating fluidized bed. As such, the distribution plate and internal downcomer are eliminated and the FBHX 100 is alternatively provided with an external separator 102 and external downcomer 104 in series.

The external separator 102 is in fluid communication with the upper chamber 16 via a product outlet 106, a product line 108 and a product inlet 110. The product outlet 106 is positioned in the FBHX 100 at substantially the same location as the gas hydrate slurry outlet 58 of the FBHX 10. The product inlet 110 opens through a vertical side 112 into a middle portion 114 of the external separator 102. The product line 108 extends from the product outlet 106 to the product inlet 110. The external separator 102 is also provided with a gas hydrate slurry outlet 116 which opens through the opposite vertical side 118 at substantially the same vertical level as the product inlet 110. A solid particle medium outlet 120 is provided in the bottom 122 of the external separator 102 and a gas vent 124 is provided in the top 126 of the external separator 102. The solid particle medium outlet 120 is integral with an open upper end 128 of the vertically-aligned external downcomer 104. The external downcomer 104 likewise has an open lower end 130 which opens into a multi-phase fluid stream line 132 at a tee junction 134. The multi-phase fluid stream line 132 provides fluid communication between the external downcomer 104 and the lower chamber 12 of the FBHX 100 via a fluidizable mixture inlet 136 positioned at substantially the same location as the multi-phase fluid stream inlet 20 of the FBHX 10.

Operation of the FBHX 100 is substantially similar to that of the FBHX 10 except that the gravity separation of the solid particle medium 66 from the solid gas hydrate particles 70 and remaining fluid components and the recovery of the gas hydrate slurry is performed external to the FBHX 100 in the external separator 102, rather than internally as in the FBHX 10. In particular, the fluidizable mixture, which comprises the solid particle medium 66, solid gas hydrate particles 70, and remaining fluid components, is discharged from the upper chamber 16 into the external separator 102 via the product outlet 106, product line 108 and product inlet 110. When the fluidizable mixture reaches the external separator 102, it disperses causing the more dense solid particle medium 66 to separate by gravity from the less dense solid gas hydrate particles 70 and the remaining fluid components in substantially the same manner as described above with respect to separation in the upper chamber 16.

The stable gas hydrate slurry is withdrawn from the external separator 104 via the gas hydrate slurry outlet 116. The solid particle medium 66 returns to the lower chamber 12 by falling under the force of gravity from the external separator 102 into the vertically aligned open upper end 128 of the external downcomer 104, passing downwardly through the external downcomer 104, and exiting the external downcomer 104 via the open lower end 130 into the multi-phase fluid stream line 132 via the tee junction 134 as shown by the arrows 138. The solid particle medium 66 mixes with the multi-phase fluid stream and is entrained therein to form the fluidizable mixture. The fluidizable mixture enters the lower chamber 12 via the fluidizable mixture inlet 136 and passes from the lower chamber 12 upward through the tube interiors 48 within the middle chamber 14 as shown by the arrows 140. It is noted that the superficial velocity of the multi-phase fluid stream as it is conveyed through the lower chamber 12 of the FBHX 100 is substantially greater as compared to the FBHX 10 because the superficial velocity in the FBHX 100 must be sufficient to maintain the solid particle medium 66 and solid gas hydrate particles 70 entrained in the remaining portion of the initial liquid phase until the fluidizable mixture reaches the external separator 102.

Figure 3:
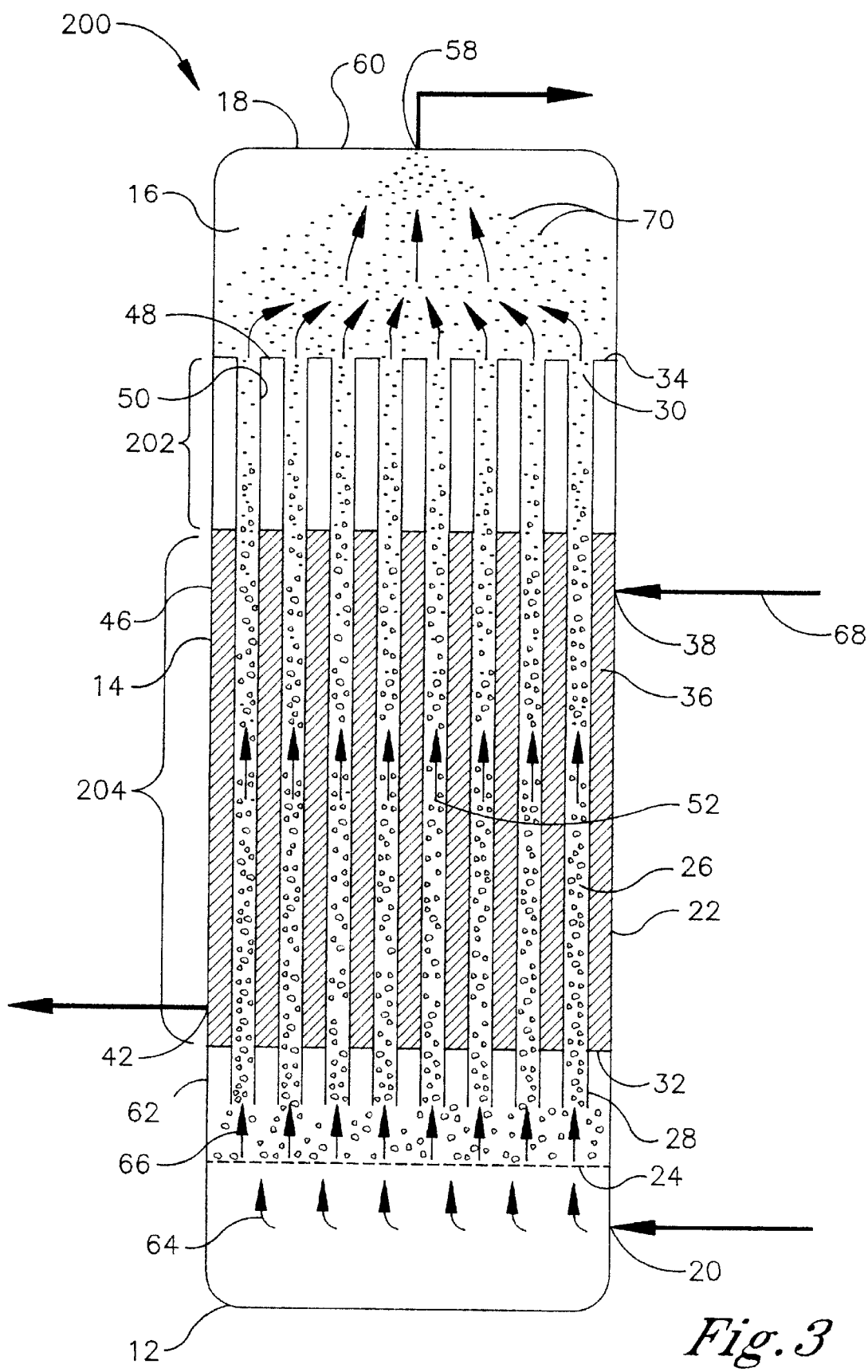
FIG. 3 is a conceptualized cross-sectional view of a fluidized bed heat exchanger having utility in a third embodiment of the process of the present invention.

Referring to FIG. 3, another alternate fluidized bed heat exchanger (FBHX) is shown and designated 200. The FBHX 200 is substantially similar to the FBHX 10 shown in FIG. 1, but the FBHX 200 is specifically adapted for use in yet another alternate embodiment of the gas hydrate slurry production process of the present invention. Accordingly, elements which are common to both FBHX's 10 and 200 are referred to by the same reference characters. The FBHX 200 is characterized by a stationary fluidized bed. As such, the FBHX 200 has no downcomer and the riser tubes 26 extend into the upper chamber 16. The upper portion 202 of the tubes 26 which extends into the upper chamber 16 defines the uncooled separation zone, while the lower portion 204 of the tubes 26 which remains in the middle chamber 14 defines the heat transfer zone.

Operation of the FBHX 200 is substantially similar to that of the FBHX 10 except that gravity separation of the solid particle medium 66 from the solid gas hydrate particles 70 and remaining fluid components is performed in the upper portion 202 of the tube interiors 48, rather than in the freeboard as in the FBHX 10. In particular, the superficial velocity of the bed is reduced by the practitioner in a manner within the purview of the skilled artisan such that the vertical position of each individual particle of the solid particle medium 66 making up the bed remains relatively constant within the middle chamber 14, or at least does not carry past the upper ends 30 of the tubes 26 into the freeboard. Such a bed is characterized as only partially fluidized or "expanded." In other respects, operation of the FBHX 200 is substantially the same as that of the FBHX 10.

While the foregoing preferred embodiments of the invention have been described and shown, it is understood that alternatives and modifications, such as those suggested and others, may be made thereto and fall within the scope of the present invention. For example, the process of the present invention has been described above as applied to transporting hydrocarbon gas. It is understood, however that the process of the present invention is generally applicable to any application, wherein it is desirable to convert a multi-phase fluid stream containing a hydrocarbon gas and water to a stable gas hydrate slurry.

We claim:

1. A process for converting a multi-phase fluid stream to a gas hydrate slurry comprising:

entraining a solid particle medium in a multi-phase fluid stream to form a fluidizable mixture, wherein said multi-phase fluid stream has an initial gas phase and an initial liquid phase, said initial liquid phase comprising an initial water and said initial gas phase comprising a hydrocarbon gas;

conveying said multi-phase fluid stream past a heat transfer surface while contacting said fluidizable mixture with said heat transfer surface, wherein said heat transfer surface is cooler than said multi-phase fluid stream;

cooling said multi-phase fluid stream upon contact with said heat transfer surface to a temperature below a gas hydrate formation temperature;

converting at least a portion of said hydrocarbon gas and at least a portion of said initial water to a plurality of solid gas hydrate particles; and forming a gas hydrate slurry comprising said plurality of solid gas hydrate particles and a remaining portion of said initial liquid phase.

2. The process of claim 1 wherein said remaining portion of said initial liquid phase includes a hydrocarbon liquid.

3. The process of claim 1 wherein said initial water is a limiting reactant, said process further comprising adding an additive water to said multi-phase fluid stream to convert substantially all of said hydrocarbon gas to solid gas hydrate particles.

4. The process of claim 1 wherein said remaining portion of said initial liquid phase includes an additive water.

5. The process of claim 4 wherein said additive water is added to said multi-phase fluid stream before or during said conversion step.

6. The process of claim 4 wherein said additive water is added to said multi-phase fluid stream after said conversion step.

7. The process of claim 1 further comprising separating said solid gas hydrate particles from said solid particle medium.

8. The process of claim 1 further comprising transporting said gas hydrate slurry via a pipeline or a motorized transport vehicle.

9. The process of claim 1 wherein solid particle medium displaces said solid gas hydrate particles from said heat transfer surface.

10. The process of claim 1 wherein said heat transfer surface is the wall of a tube having a tube interior and a tube exterior.

11. The process of claim 10 wherein said fluidizable mixture is conveyed through said tube interior.

12. The process of claim 1 wherein said multi-phase fluid stream is a hydrocarbon production stream and said hydrocarbon gas is natural gas.

13. A process for converting a multi-phase fluid stream to a gas hydrate slurry comprising:

providing a fluidized bed heat exchanger having a shell enclosing a heat transfer medium flowpath, a fluidizable mixture flowpath in fluid isolation from said heat transfer medium flowpath, a heat transfer surface in heat communication with said heat transfer medium flowpath and said fluidizable mixture flowpath, and an internal downcomer, wherein said portion of said shell enclosing said heat transfer surface defines a heat transfer zone;

entraining a solid particle medium in a multi-phase fluid stream to form a fluidizable mixture, wherein said multi-phase fluid stream has an initial gas phase and an initial liquid phase, said initial liquid phase comprising an initial water and said initial gas phase comprising a hydrocarbon gas;

conveying a heat transfer medium through said heat transfer medium flowpath to cool said heat transfer surface;

conveying said fluidizable mixture through said fluidizable mixture flowpath and contacting said fluidizable mixture with said heat transfer surface in said heat transfer zone, wherein said heat transfer surface is cooler than said multi-phase fluid stream;

cooling said multi-phase fluid stream upon contact with said heat transfer surface in said heat transfer zone to a temperature below a gas hydrate formation temperature;

converting at least a portion of said hydrocarbon gas and at least a portion of said initial water to a plurality of solid gas hydrate particles in said fluidizable mixture flowpath;

withdrawing said fluidizable mixture including said solid gas hydrate particles from said heat transfer zone;

separating said solid gas hydrate particles from said solid particle medium to recover a gas hydrate slurry comprising said plurality of solid gas hydrate particles and a remaining portion of said initial liquid phase; and returning said solid particle medium to said heat transfer zone via said internal downcomer.

14. The process of claim 13 wherein said remaining portion of said initial liquid phase includes a hydrocarbon liquid.

15. The process of claim 13 wherein said initial water is a limiting reactant, said process further comprising adding an additive water to said multi-phase fluid stream to convert substantially all of said hydrocarbon gas to said solid gas hydrate particles.

16. The process of claim 13 wherein said remaining portion of said initial liquid phase includes an additive water.

17. The process of claim 13 further comprising transporting said gas hydrate slurry via a pipeline or a motorized transport vehicle.

18. A process for converting a multi-phase fluid stream to a gas hydrate slurry comprising:

providing a fluidized bed heat exchanger having an external separator and an external downcomer and having a shell enclosing a heat transfer medium flowpath, a fluidizable mixture flowpath in fluid isolation from said heat transfer medium flowpath, a heat transfer surface in heat communication with said heat transfer medium flowpath and said fluidizable mixture flowpath, wherein said portion of said shell enclosing said heat transfer surface defines a heat transfer zone;

entraining a solid particle medium in a multi-phase fluid stream to form a fluidizable mixture, wherein said multi-phase fluid stream has an initial gas phase and an initial liquid phase, said initial liquid phase comprising an initial water and said initial gas phase comprising a hydrocarbon gas;

conveying a heat transfer medium through said heat transfer medium flowpath to cool said heat transfer surface;

conveying said fluidizable mixture through said fluidizable mixture flowpath and contacting said fluidizable mixture with said heat transfer surface in said heat transfer zone, wherein said heat transfer surface is cooler than said multi-phase fluid stream;

cooling said multi-phase fluid stream upon contact with said heat transfer surface in said heat transfer zone to a temperature below a gas hydrate formation temperature;

converting at least a portion of said hydrocarbon gas and at least a portion of said initial water to a plurality of solid gas hydrate particles in said fluidizable mixture flowpath;

conveying said fluidizable mixture including said solid gas hydrate particles to said external separator;

separating said solid gas hydrate particles from said solid particle medium in said external separator to recover a gas hydrate slurry comprising said plurality of solid gas hydrate particles and a remaining portion of said initial liquid phase; and returning said solid particle medium to said heat transfer zone via said external downcomer.

19. The process of claim 18 wherein said remaining portion of said initial liquid phase includes a hydrocarbon liquid.

20. The process of claim 18 wherein said initial water is a limiting reactant, said process further comprising adding an additive water to said multi-phase fluid stream to convert substantially all of said hydrocarbon gas to solid gas hydrate particles.

21. The process of claim 18 wherein said remaining portion of said initial liquid phase includes an additive water.

22. The process of claim 18 further comprising transporting said gas hydrate slurry via a pipeline or a motorized transport vehicle.

23. A process for converting a multi-phase fluid stream to a gas hydrate slurry comprising:

providing a fluidized bed heat exchanger having a shell enclosing a heat transfer medium flowpath, a fluidizable mixture flowpath in fluid isolation from said heat transfer medium flowpath, and a heat transfer surface in heat communication with said heat transfer medium flowpath and said fluidizable mixture flowpath, wherein said portion of said shell enclosing said heat transfer surface defines a heat transfer zone;

entraining a solid particle medium in a multi-phase fluid stream to form a fluidizable mixture, wherein said multi-phase fluid stream has an initial gas phase and an initial liquid phase, said initial liquid phase comprising an initial water and said initial gas phase comprising a hydrocarbon gas;

conveying a heat transfer medium through said heat transfer medium flowpath to cool said heat transfer surface;

conveying said fluidizable mixture through said fluidizable mixture flowpath and contacting said fluidizable mixture with said heat transfer surface in said heat transfer zone, wherein said heat transfer surface is cooler than said multi-phase fluid stream;

cooling said multi-phase fluid stream upon contact with said heat transfer surface in said heat transfer zone to a temperature below a gas hydrate formation temperature;

converting at least a portion of said hydrocarbon gas and at least a portion of said initial water to a plurality of solid gas hydrate particles in said fluidizable mixture flowpath; and separating said solid gas hydrate particles from said solid particle medium to recover a gas hydrate slurry comprising said plurality of solid gas hydrate particles and a remaining portion of said initial liquid phase.

24. The process of claim 23 wherein said remaining portion of said initial liquid phase includes a hydrocarbon liquid.

25. The process of claim 23 wherein said initial water is a limiting reactant, said process further comprising adding an additive water to said multi-phase fluid stream to convert substantially all of said hydrocarbon gas to solid gas hydrate particles.

26. The process of claim 23 wherein said remaining portion of said initial liquid phase includes an additive water.

27. The process of claim 23 further comprising transporting said gas hydrate slurry via a pipeline or a motorized transport vehicle.

* * * * *